(12) United States Patent
La Forest et al.

(10) Patent No.: US 10,300,631 B2
(45) Date of Patent: May 28, 2019

(54) CARBON FIBER PREFORMS

(71) Applicant: Honeywell International Inc., Morris Plains, NJ (US)

(72) Inventors: Mark L. La Forest, Theresa, NY (US); Slawomir T. Fryska, Granger, IN (US)

(73) Assignee: Honeywell International Inc., Morris Plains, NJ (US)

(*) Notice: Subject to any disclaimer, the term of this patent is extended or adjusted under 35 U.S.C. 154(b) by 330 days.

(21) Appl. No.: 14/954,783

(22) Filed: Nov. 30, 2015

(65) Prior Publication Data

US 2017/0151712 A1    Jun. 1, 2017

(51) Int. Cl.
*B29C 67/00* (2017.01)
*B29B 11/16* (2006.01)
(Continued)

(52) U.S. Cl.
CPC .............. *B29B 11/06* (2013.01); *B29B 11/16* (2013.01); *B29C 64/106* (2017.08);
(Continued)

(58) Field of Classification Search
CPC ....... B29C 70/06; B29C 70/24; B29C 64/106; B29C 64/165; B29C 64/386; B33Y 80/00; B33Y 30/00; B33Y 70/00; B33Y 10/00; C04B 2235/5268; C04B 2235/52; C04B 2235/72; C04B 2237/385; C04B 2237/584; C04B 2237/586; C04B 35/83; B29K 2105/14; B29K 2105/0058; B29K 2307/04; B29K 2995/005; B29L 2031/16; B32B 9/007; B32B 5/12; B32B 5/26; B32B 5/022; B32B 5/024; B32B 5/08; B32B 27/12; B32B 27/08; B32B 27/42; B32B 2264/10;
(Continued)

(56) References Cited

U.S. PATENT DOCUMENTS

| 3,028,284 A | 4/1962 | Reeves |
| 3,596,314 A | 8/1971 | Krugler |

(Continued)

FOREIGN PATENT DOCUMENTS

| CN | 101511569 A | 8/2009 |
| CN | 103939509 | 7/2014 |

(Continued)

OTHER PUBLICATIONS

Extended Search Report from counterpart European Application No. 16197853.1-1703, dated May 17, 2017, 8 pp.
(Continued)

*Primary Examiner* — Camie S Thompson
(74) *Attorney, Agent, or Firm* — Shumaker & Sieffert, P.A.

(57) ABSTRACT

In some examples, a method including depositing a resin and a plurality of carbon fibers via a print head of a three-dimensional printing system to form a carbon fiber preform including a plurality of individual carbon fiber layers, wherein each individual layer of the plurality of individual carbon fiber layers includes the resin and carbon fibers, and wherein the carbon fiber preform exhibits at least one of a non-uniform composition of the resin within the preform, different types of the carbon fibers within the preform, or non-uniform fiber orientation within the preform.

17 Claims, 5 Drawing Sheets

(51) Int. Cl.

| | |
|---|---|
| *B29B 11/06* | (2006.01) |
| *B29C 70/06* | (2006.01) |
| *C04B 35/83* | (2006.01) |
| *B33Y 70/00* | (2015.01) |
| *B29C 64/106* | (2017.01) |
| *B29C 64/165* | (2017.01) |
| *B29C 64/386* | (2017.01) |
| *B32B 18/00* | (2006.01) |
| *F16D 65/12* | (2006.01) |
| *B32B 5/02* | (2006.01) |
| *B32B 5/12* | (2006.01) |
| *B32B 5/26* | (2006.01) |
| *B32B 27/08* | (2006.01) |
| *B32B 27/12* | (2006.01) |
| *B32B 27/42* | (2006.01) |
| *B33Y 10/00* | (2015.01) |
| *B33Y 30/00* | (2015.01) |
| *B33Y 50/02* | (2015.01) |
| *B33Y 80/00* | (2015.01) |
| *B29K 105/00* | (2006.01) |
| *B29K 105/14* | (2006.01) |
| *B29K 279/00* | (2006.01) |
| *B29K 307/04* | (2006.01) |
| *B29L 31/16* | (2006.01) |
| *B32B 9/00* | (2006.01) |

(52) U.S. Cl.
CPC .......... *B29C 64/165* (2017.08); *B29C 64/386* (2017.08); *B29C 70/06* (2013.01); *B32B 5/022* (2013.01); *B32B 5/024* (2013.01); *B32B 5/12* (2013.01); *B32B 5/26* (2013.01); *B32B 18/00* (2013.01); *B32B 27/08* (2013.01); *B32B 27/12* (2013.01); *B32B 27/42* (2013.01); *B33Y 70/00* (2014.12); *C04B 35/83* (2013.01); *F16D 65/126* (2013.01); *B29K 2105/0058* (2013.01); *B29K 2105/14* (2013.01); *B29K 2279/00* (2013.01); *B29K 2307/04* (2013.01); *B29K 2995/005* (2013.01); *B29L 2031/16* (2013.01); *B32B 9/007* (2013.01); *B32B 2260/023* (2013.01); *B32B 2260/046* (2013.01); *B32B 2264/10* (2013.01); *B32B 2264/102* (2013.01); *B32B 2264/108* (2013.01); *B32B 2307/302* (2013.01); *B32B 2307/50* (2013.01); *B32B 2307/554* (2013.01); *B32B 2307/714* (2013.01); *B32B 2307/722* (2013.01); *B32B 2475/00* (2013.01); *B32B 2605/18* (2013.01); *B33Y 10/00* (2014.12); *B33Y 30/00* (2014.12); *B33Y 50/02* (2014.12); *B33Y 80/00* (2014.12); *C04B 2235/3232* (2013.01); *C04B 2235/3418* (2013.01); *C04B 2235/3826* (2013.01); *C04B 2235/424* (2013.01); *C04B 2235/425* (2013.01); *C04B 2235/526* (2013.01); *C04B 2235/5264* (2013.01); *C04B 2235/5268* (2013.01); *C04B 2235/5272* (2013.01); *C04B 2235/6026* (2013.01); *C04B 2237/385* (2013.01); *C04B 2237/584* (2013.01); *C04B 2237/586* (2013.01); *F16D 2200/006* (2013.01); *F16D 2200/0047* (2013.01)

(58) Field of Classification Search
CPC ........ B32B 2264/102; B32B 2264/108; B32B 2307/50; B32B 2307/554; B32B 2307/714; B32B 2307/722; B32B 2307/302; B32B 2605/18; B29B 11/06; B29B 11/16; F16D 65/126; F16D 2200/0047; F16D 2200/006
See application file for complete search history.

(56) References Cited

U.S. PATENT DOCUMENTS

| | | |
|---|---|---|
| 3,703,255 A | 11/1972 | Wade |
| 3,975,128 A | 8/1976 | Schluter |
| 3,982,877 A | 9/1976 | Wyeth et al. |
| 4,264,556 A | 4/1981 | Kumar et al. |
| 4,428,906 A | 1/1984 | Rozmus |
| 4,756,680 A | 7/1988 | Ishii |
| 4,837,073 A | 6/1989 | McAllister et al. |
| 4,957,585 A | 9/1990 | Semff |
| 5,009,823 A | 4/1991 | Kromrey |
| 5,137,663 A | 8/1992 | Conaway |
| 5,137,755 A | 8/1992 | Fujikawa et al. |
| 5,147,588 A | 9/1992 | Okura et al. |
| 5,178,705 A | 1/1993 | Kimbara et al. |
| 5,187,001 A | 2/1993 | Brew |
| 5,242,746 A | 9/1993 | Bommier et al. |
| 5,283,109 A | 2/1994 | Kaplan et al. |
| 5,306,448 A | 4/1994 | Kromrey |
| 5,382,392 A | 1/1995 | Prevorsek et al. |
| 5,516,271 A | 5/1996 | Swenor et al. |
| 5,518,385 A | 5/1996 | Graff |
| 5,576,358 A | 11/1996 | Lem et al. |
| 5,686,144 A | 11/1997 | Thebault et al. |
| 5,728,345 A | 3/1998 | Hlavaty et al. |
| 5,759,622 A | 6/1998 | Stover |
| 5,962,135 A | 10/1999 | Walker et al. |
| 6,054,082 A | 4/2000 | Heide et al. |
| 6,093,482 A | 7/2000 | Park et al. |
| 6,110,268 A | 8/2000 | Gross et al. |
| 6,214,279 B1 | 4/2001 | Yang et al. |
| 6,221,475 B1 | 4/2001 | Domergue et al. |
| 6,245,424 B1 | 6/2001 | Lau et al. |
| 6,261,486 B1 | 7/2001 | Sulzbach et al. |
| 6,267,920 B1 | 7/2001 | Arakawa et al. |
| 6,305,925 B1 | 10/2001 | Cassani |
| 6,325,608 B1 | 12/2001 | Shivakumar et al. |
| 6,358,565 B1 | 3/2002 | Krenkel et al. |
| 6,372,166 B1 | 4/2002 | Cassani |
| 6,455,159 B1 | 9/2002 | Walker et al. |
| 6,471,800 B2 | 10/2002 | Jang et al. |
| 6,508,970 B2 | 1/2003 | Chandra |
| 6,521,152 B2 | 2/2003 | Wood et al. |
| 6,537,470 B1 | 3/2003 | Wood et al. |
| 6,555,173 B1 | 4/2003 | Forsythe et al. |
| 6,578,474 B1 | 6/2003 | Sasaki |
| 6,726,753 B2 | 4/2004 | Kouchouthakis et al. |
| 6,749,937 B2 | 6/2004 | Gray |
| 6,756,121 B2 | 6/2004 | Forsythe et al. |
| 6,884,467 B2 | 4/2005 | Walker et al. |
| 6,886,668 B2 | 5/2005 | Kouchouthakis et al. |
| 6,896,968 B2 | 5/2005 | Golecki |
| 6,939,490 B2 | 9/2005 | La Forest et al. |
| 7,025,913 B2 | 4/2006 | La Forest et al. |
| 7,052,632 B2 | 5/2006 | Lavasserie et al. |
| 7,063,870 B2 | 6/2006 | La Forest et al. |
| 7,118,805 B2 | 10/2006 | Walker et al. |
| 7,141,207 B2 | 11/2006 | Jandeska, Jr. et al. |
| 7,172,408 B2 | 2/2007 | Wood et al. |
| 7,198,739 B2 | 4/2007 | La Forest et al. |
| 7,252,499 B2 | 8/2007 | La Forest et al. |
| 7,258,896 B2 | 8/2007 | Deckard et al. |
| 7,318,717 B2 | 1/2008 | Wood et al. |
| 7,332,112 B1 | 2/2008 | Shivakumar et al. |
| 7,332,195 B2 | 2/2008 | Arico et al. |
| 7,370,738 B2 | 5/2008 | Vollweiter |
| 7,393,370 B2 | 7/2008 | Peterman, Jr. et al. |
| 7,423,072 B2 | 9/2008 | Lee et al. |
| 7,442,024 B2 | 10/2008 | La Forest et al. |
| 7,556,490 B2 | 7/2009 | Wicker et al. |
| 7,589,868 B2 | 9/2009 | Velde et al. |
| 7,632,435 B2 | 12/2009 | Simpson et al. |

(56) References Cited

U.S. PATENT DOCUMENTS

| | | | |
|---|---|---|---|
| 7,681,627 B2 | 3/2010 | Schmitz et al. |
| 7,698,817 B2 | 4/2010 | Khambete et al. |
| 7,700,014 B2 | 4/2010 | Simpson et al. |
| 7,727,448 B2 | 6/2010 | Boutefeu et al. |
| 7,867,566 B2 | 1/2011 | Blanton et al. |
| 7,972,129 B2 | 7/2011 | O'Donoghue |
| 8,002,919 B2 | 8/2011 | Johnson et al. |
| 8,492,466 B2 | 7/2013 | Abe et al. |
| 8,501,033 B2 | 8/2013 | Southwell et al. |
| 8,592,519 B2 | 11/2013 | Martinoni |
| 8,597,772 B2 | 12/2013 | La Forest et al. |
| 8,742,014 B2 | 6/2014 | Hongo |
| 2001/0019798 A1 | 9/2001 | Kajiura et al. |
| 2001/0030094 A1 | 10/2001 | Pareti |
| 2002/0022570 A1 | 2/2002 | Reynolds, III et al. |
| 2002/0047227 A1 | 4/2002 | Matsumoto |
| 2003/0003286 A1 | 1/2003 | Gruber et al. |
| 2003/0021901 A1 | 1/2003 | Gasse |
| 2003/0030188 A1 | 2/2003 | Spengler |
| 2003/0111752 A1 | 6/2003 | Wood et al. |
| 2003/0143436 A1 | 7/2003 | Forsythe et al. |
| 2003/0214064 A1 | 11/2003 | Shin et al. |
| 2004/0020728 A1 | 2/2004 | Koucouthakis et al. |
| 2004/0113302 A1 | 6/2004 | La Forest et al. |
| 2004/0168612 A1 | 9/2004 | Saver |
| 2004/0202896 A1 | 10/2004 | Gray |
| 2004/0219510 A1 | 11/2004 | Lowery et al. |
| 2006/0046059 A1 | 3/2006 | Arico et al. |
| 2006/0069176 A1 | 3/2006 | Bowman et al. |
| 2006/0127599 A1 | 6/2006 | Wojak |
| 2006/0197244 A1 | 9/2006 | Simpson et al. |
| 2006/0232392 A1 | 10/2006 | Emmett et al. |
| 2006/0267252 A1 | 11/2006 | Steinmann et al. |
| 2006/0279012 A1 | 12/2006 | Simpson et al. |
| 2007/0063378 A1 | 3/2007 | O'Donoghue |
| 2007/0132126 A1 | 6/2007 | Shao et al. |
| 2007/0154712 A1 | 7/2007 | Mazany et al. |
| 2007/0218208 A1 | 9/2007 | Walker et al. |
| 2008/0318010 A1 | 12/2008 | Wozniak et al. |
| 2009/0145314 A1 | 6/2009 | Botrie |
| 2009/0169825 A1 | 7/2009 | Farmer et al. |
| 2009/0176034 A1 | 7/2009 | Ruuttu et al. |
| 2009/0229926 A1 | 9/2009 | Schaefer |
| 2009/0298962 A1 | 12/2009 | Studer et al. |
| 2009/0321979 A1 | 12/2009 | Hiraide |
| 2010/0000070 A1 | 1/2010 | La Forest et al. |
| 2011/0030940 A1 | 2/2011 | Takeda |
| 2012/0082559 A1 | 4/2012 | Guglielmin et al. |
| 2012/0104659 A1 | 5/2012 | La Forest et al. |
| 2012/0251829 A1 | 10/2012 | Xu et al. |
| 2012/0304449 A1 | 12/2012 | Jackson et al. |
| 2013/0157826 A1 | 6/2013 | Preckel et al. |
| 2013/0174969 A1 | 7/2013 | Karb et al. |
| 2013/0237636 A1 | 9/2013 | Strauss |
| 2013/0244039 A1 | 9/2013 | Peters et al. |
| 2013/0248304 A1 | 9/2013 | Lee et al. |
| 2013/0284548 A1 | 10/2013 | Guether et al. |
| 2013/0323473 A1 | 12/2013 | Dietsch et al. |
| 2014/0134335 A1 | 5/2014 | Pridoehl et al. |
| 2014/0194328 A1 | 7/2014 | Alessi |
| 2014/0298728 A1 | 10/2014 | Keshavan |
| 2014/0356612 A1 | 12/2014 | Sano et al. |
| 2014/0361460 A1 | 12/2014 | Mark |
| 2015/0018136 A1 | 1/2015 | Goldstein et al. |
| 2015/0093506 A1 | 4/2015 | Bucci et al. |
| 2015/0321187 A1 | 11/2015 | Dias et al. |
| 2016/0046803 A1 | 2/2016 | Boday et al. |
| 2016/0082695 A1 | 3/2016 | Swartz et al. |
| 2016/0151982 A1 | 6/2016 | Sand |
| 2016/0332881 A1* | 11/2016 | Troester .................. B32B 18/00 |
| 2016/0346997 A1 | 12/2016 | Lewis et al. |

FOREIGN PATENT DOCUMENTS

| | | |
|---|---|---|
| CN | 104451606 | 3/2015 |
| CN | 104496508 | 4/2015 |
| DE | 102007057450 A1 | 6/2009 |
| DE | 102014006432 A1 | 11/2015 |
| EP | 1165191 A1 | 1/2002 |
| EP | 1724245 A1 | 11/2006 |
| EP | 1731292 A2 | 12/2006 |
| EP | 1731292 A3 | 12/2008 |
| EP | 2295227 A2 | 3/2011 |
| EP | 2450170 A2 | 9/2012 |
| EP | 3095593 A1 | 11/2016 |
| GB | 2386951 | 1/2003 |
| GB | 2470098 | 11/2010 |
| JP | 2013088196 | 5/2013 |
| JP | 5352893 B2 | 11/2013 |
| WO | 9908980 A1 | 2/1999 |
| WO | 0054852 A1 | 9/2000 |
| WO | 2004050319 A1 | 6/2004 |
| WO | 2004052629 A1 | 6/2004 |
| WO | 2004106766 | 12/2004 |
| WO | 2006033373 A1 | 3/2006 |
| WO | 2006086167 A1 | 8/2006 |
| WO | 2013126981 A1 | 9/2013 |
| WO | 2014035382 A1 | 3/2014 |
| WO | 2014060430 A1 | 4/2014 |
| WO | 2014134224 A2 | 9/2014 |
| WO | 2014153535 A2 | 9/2014 |
| WO | 2014174540 A1 | 10/2014 |
| WO | 2014175625 A1 | 10/2014 |
| WO | 2015006697 A1 | 1/2015 |
| WO | 2015038260 A2 | 3/2015 |
| WO | 2015053658 A1 | 4/2015 |

OTHER PUBLICATIONS

Tekinalp et al., "Highly oriented carbon fiber-polymer composites via additive manufacturing," Composites Science and Technology, ElSevier, Oct. 9, 2014, 7 pp.

U.S. Appl. No. 15/048,840, by Honeywell International Inc. (Inventors: Jeffrey Rowe et al.), filed Feb. 19, 2016.

Senese, "MarkForged Lets you 3D Print with Carbon Fiber and Kevlar on a Budget," Makezine, retrieved from URL: http://makezine.com/2015/01/15/3d-printed-carbon-fiber-markforged and accessed Nov. 11, 2016, Jan. 15, 2015, 6 pp.

"Application of nanoparticles could improve ALM components," technical trends ALM, MPR, Elsevier Ltd., Nov.-Dec. 2012, 3 pp.

"Arevo Labs introduces carbon fiber reinforced polymers to 3D print ultra-strong parts," 3D printer and 3D printing news, www.3ders.org, Mar. 24, 2014, 9 pp.

"Carbon-fiber filled Nylon—A Material Alternative," Northwest Rapid Manufacturing, Jun. 25, 2012, 3 pp.

"Mark One, the world's first carbon fiber 3D printer now available for pre-order," 3D printer and 3D printing news, www.3ders.org, Feb. 18, 2014, 11 pp.

Black, "3D Printing continuous carbon fiber composites?," Composite's World, Gardner Business Media, Inc., May 1, 2014, 8 pp.

Crandall, "Where Will Additive Manufacturing Take Us?," APICS Magazine, Jan./Feb. 2013, 3 pp.

Divyashree et al., "Design, Implement and Develop CNT-Metal Composite PCB Wiring Using a Metal 3D Printer," International Journal of Scientific & Engineering Research, vol. 5, No. 5, May 2014, 5 pp.

A. Fatz, et al., "Manufacture of Functionally Gradient Carbon-Carbon Composites," Proceedings of the 17th Technical Conference of the American Society of Composites, Oct. 21-23, 2002, Purdue University, West Lafayette, Ind., 9 pp.

Krassenstein, "3DXTech's Carbon Nanotube 3D Printer Filament is Here: Exclusive images and details," 3DXTECH, May 13, 2014, 2 pp.

Thryft, "3D Printing High-Strength Carbon Composites Using PEEK, PAEK, " Design News, Engineering Materials, Apr. 14, 2014, 5 pp.

(56) References Cited

OTHER PUBLICATIONS

Vie, et al., "Inkject of 200 nm monodisperse carbon nanoparticles: from nanoparticles synthesis to smart ink formulation," NSTI-Nanotech, vol. 2, May 2013, pp. 243-246.
U.S. Appl. No. 14/711,550, filed by Fryska et al., May 13, 2015.
U.S. Appl. No. 14/711,590, filed by Troester, et al., May 13, 2015.
U.S. Appl. No. 14/711,508, filed by Fryska et al., May 13, 2015.
U.S. Appl. No. 14/711,426, filed by Troester et al., May 13, 2015.
U.S. Appl. 62/161,109, filed by Rowe et al., May 13, 2015.
U.S. Appl. No. 14/788,217, filed by La Forest et al., Jun. 30, 2015.
U.S. Appl. No. 14/854,993, filed by La Forest et al., Sep. 15, 2015.
Windhorst et al., "Carbon-carbon composites: a summary of recent developments and applications," Materials and Design, vol. 18, Issue 1, 1997, 5 pp. (Applicant points out, in accordance with MPEP 609.04(a), that the year of publication,1997, is sufficiently earlier than the effective U.S. filing date, so that the particular month of publication is not in issue.).
Callister, "Chapter 16: Composites," Materials Science and Engineering, John Wiley & Sons, Inc., Seventh Edition, Chapter 16: pp. 577-620,2007. (Applicant points out, in accordance with MPEP 609.04(a), that the year of publication, 2007, is sufficiently earlier than the effective U.S. filing date, so that the particular month of publication is not in issue.)
Notice of Intent to Grant and Text Intended to Grant from counterpart European Application No. 16197853.1, dated Oct. 10, 2018, 43 pp.

\* cited by examiner

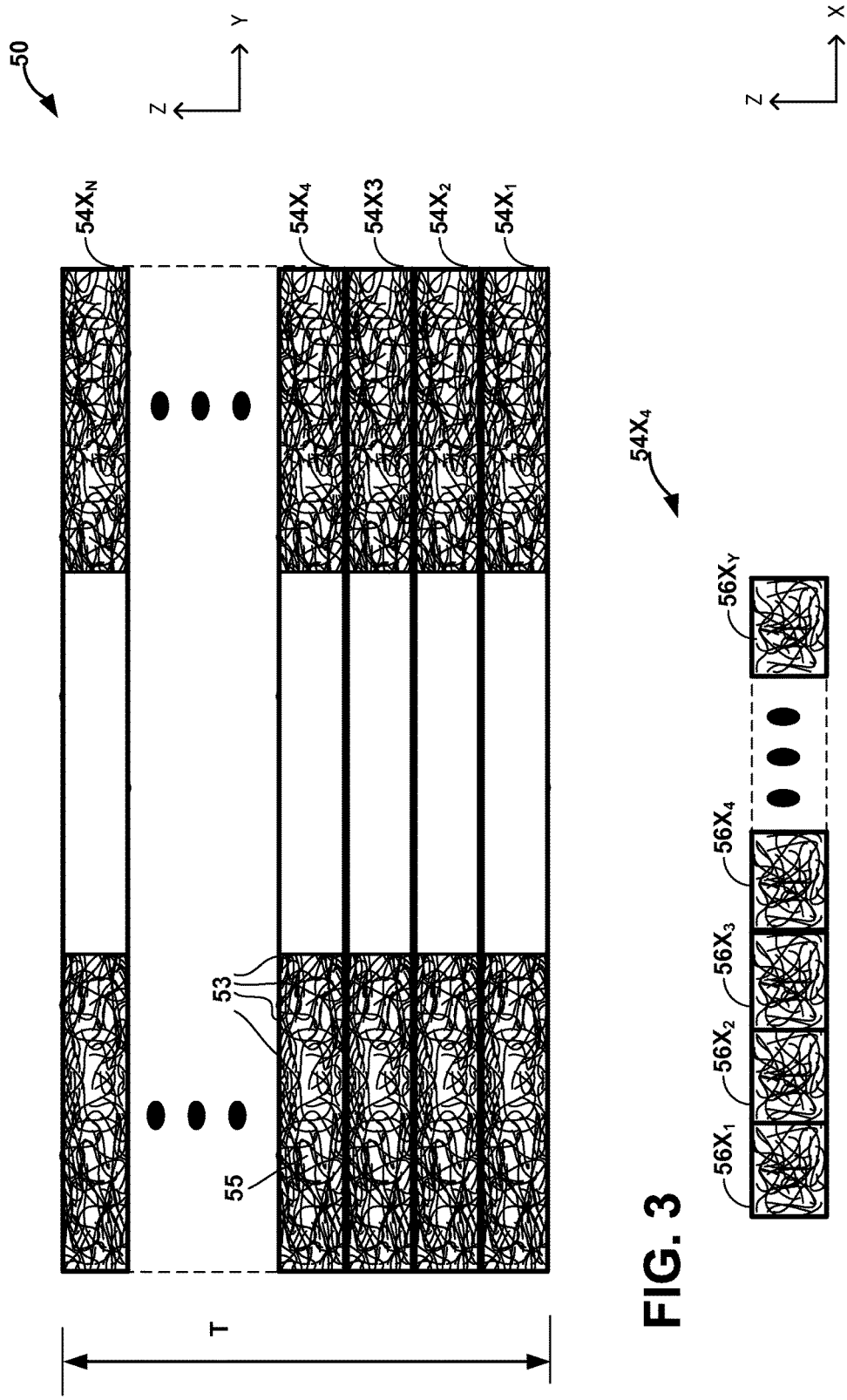

CARBON FIBER PREFORMS

TECHNICAL FIELD

The disclosure relates to carbon fiber preforms, e.g., carbon fiber preforms used to form carbon-carbon composite materials.

BACKGROUND

Carbon fiber-reinforced carbon materials, also referred to as carbon-carbon (C—C) composite materials, are composite materials that include carbon fibers reinforced in a matrix of carbon material. The C—C composite materials can be used in many high temperature applications. For example, the aerospace industry employs C—C composite materials as friction materials for commercial and military aircraft, such as brake friction materials.

SUMMARY

Devices, systems, and techniques for forming carbon fiber preforms are described. Example carbon fiber preforms and carbon-carbon composite components resulting from the techniques are also described. In some examples, a carbon fiber preform may include a plurality of individual layers, each layer comprising a plurality of carbon fibers and resin. The resin and the plurality of carbon fibers may be deposited by a print head of a three-dimensional printing system. For example, the resin and the carbon fibers may be deposited together via the print head, e.g., as a composite material including a plurality carbon fiber mixed with the resin or as a plurality of carbon fibers coated with the resin. Additionally or alternatively, the resin and carbon fibers may be deposited separately via the print head to form an individual layer of the carbon fiber perform.

In total, the individual layers of resin and carbon fibers may form a carbon fiber preform that exhibits at least one of a non-uniform composition of the resin within the preform, different types of the carbon fibers within the preform, or non-uniform fiber orientation within the preform. For example, the resin at a first portion of the carbon fiber preform may be different than the resin at a second portion of the carbon fiber preform. As another example, the type of carbon fiber at a first portion of the preform may be different than the type of carbon fiber at a second portion of the preform. As another example, the orientation of carbon fibers (e.g., relative to the x-y plane of the preform) at a first portion of the preform may be different than the orientation of the carbon fibers at a second portion of the preform. As used herein, the orientation of the carbon fibers may refer to the orientation of the longitudinal axis of the carbon fibers.

The carbon fiber preform may be densified, e.g., via chemical vapor infiltration (CVI)/chemical vapor deposition (CVD), and or resin densification, to form a densified C—C composite material. The at least one of a non-uniform composition of the resin within the preform, different types of the carbon fibers within the preform, or non-uniform fiber orientation within the preform may be selected to provide for one or more desired properties of such a densified C—C composite material. For example, the at least one of the non-uniform composition of the resin within the preform, different types of the carbon fibers within the preform, or non-uniform fiber orientation within the preform may be configured to at least one of modify a friction property, increase a density, or increase a strength of a densified C—C composite material formed from the carbon fiber preform compared to that of a densified C—C composite material formed from a carbon fiber preform without the non-uniform resin composition, different fiber types and/or non-uniform fiber orientation.

In one aspect, the disclosure is directed to a method comprising depositing a resin and a plurality of carbon fibers via a print head of a three-dimensional printing system to form a carbon fiber preform including a plurality of individual carbon fiber layers, wherein each individual layer of the plurality of individual carbon fiber layers includes the resin and carbon fibers, and wherein the carbon fiber preform exhibits at least one of a non-uniform composition of the resin within the preform, different types of the carbon fibers within the preform, or non-uniform fiber orientation within the preform.

In another aspect, the disclosure is directed to a carbon fiber preform comprising a plurality of individual carbon fiber layers, wherein each individual layer of the plurality of individual layers includes a resin and a plurality of carbon fibers, and wherein the carbon fiber preform exhibits at least one of a non-uniform composition of the resin within the preform, different types of the carbon fibers within the preform, or non-uniform fiber orientation within the preform.

In another aspect, the disclosure is directed to a system comprising a print head configured to deposit a resin and a plurality of carbon fibers; and a controller configured to control deposition of the resin and the plurality of carbon fibers to form a carbon fiber preform including a plurality of individual carbon fiber layers, wherein each individual layer of the plurality of individual carbon fiber layers includes the resin and carbon fibers, and wherein the carbon fiber preform exhibits at least one of a non-uniform composition of the resin within the preform, different types of the carbon fibers within the preform, or non-uniform fiber orientation within the preform.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 2-4 are conceptual diagrams illustrating an example carbon fiber preform in accordance with aspects of the disclosure.

DETAILED DESCRIPTION

Figure 1:
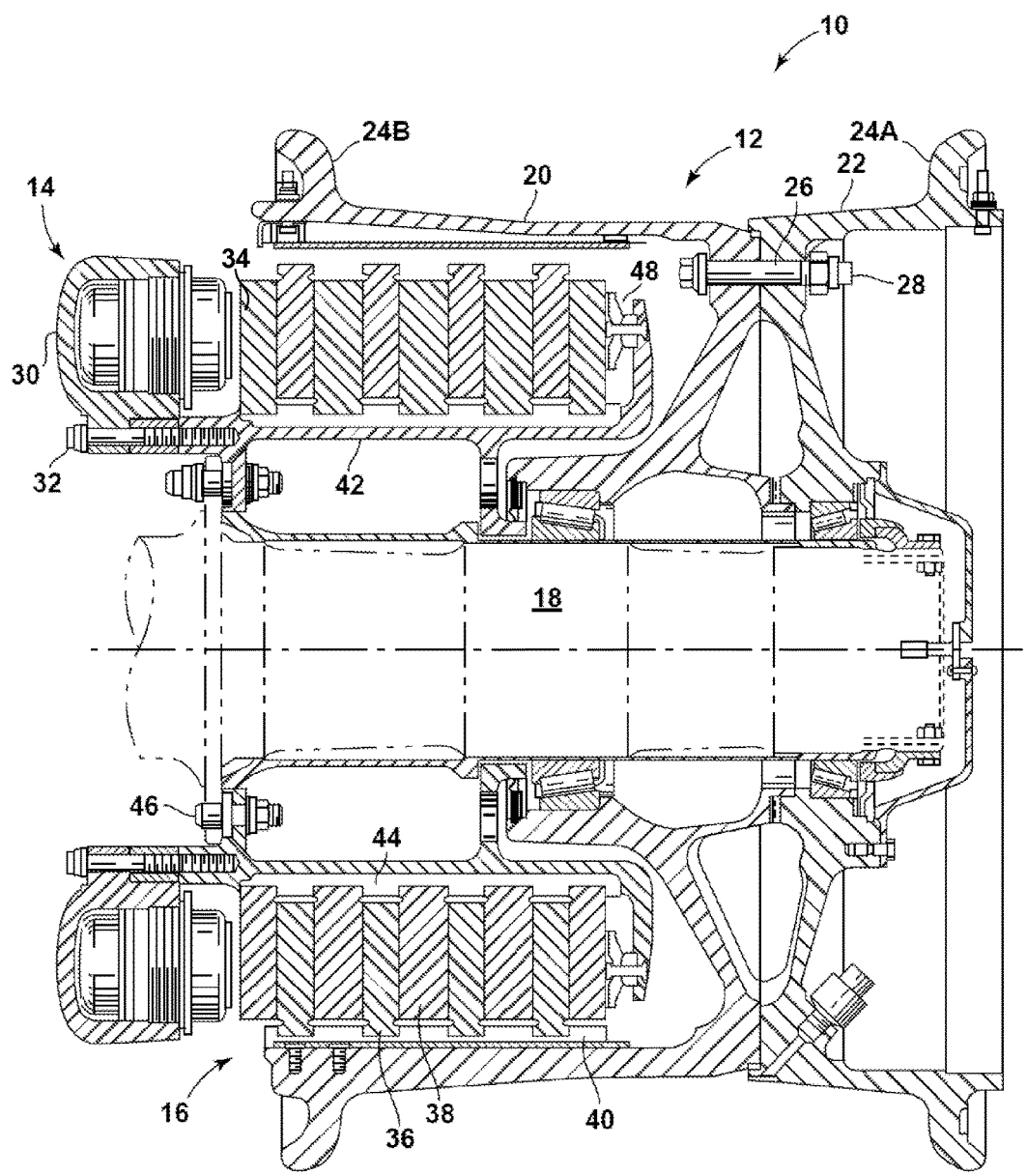
FIG. 1 is a schematic block diagram illustrating an example aircraft brake assembly.

Example techniques for forming a carbon fiber preform are described herein, along with carbon fiber preform, carbon-carbon composite materials, and structures (also referred to herein as "components") formed from the carbon fiber preform. Densified C—C composite materials used, for example, in aerospace applications such as brake discs, may be formed from carbon fiber preforms that have been densified using a variety of densification techniques. For example, a carbon fiber preform may be formed by layering fabric sheets formed of woven or nonwoven carbon fiber, which may be then be densified by infiltrating the preform with liquid pitch using vacuum pressure infiltration (VPI) and/or resin transfer molding (RTM) followed by carbonization of the pitch to achieve a C—C composite material exhibiting a desired final density. Additionally or alternatively, CVI/CVD may be used to densify the fabric preform or another carbon preform. In the case of an aircraft brake pad, in some examples, the carbonized preform may take the form of an annular ring, although other shapes may also be used in other examples.

In accordance with one or more examples of the disclosure, a carbon fiber preform may include a plurality of individual layers, each layer being formed of carbon fibers and resin. The resin and carbon fibers of each individual layer may be deposited via a print head of a three-dimensional printing system. Using the three-dimensional printing system, the individual layers may be sequentially formed on a layer-by-layer basis in three-dimensions to generate a preform with, e.g., a desired geometry. The three-dimensional position of the print head may be under automated control, e.g., by a controller that controls a control arm, during the process such that the location and orientation at which the resin and carbon fiber is deposited may be precisely controlled to define a multilayer carbon fiber preform with desired properties, e.g., with a desired geometry.

As described herein, the deposition process may be controlled such that resulting preform exhibits at least one (e.g., one, two, or all three of the following) of a non-uniform composition of the resin within the preform, different types of the carbon fibers within the preform, or non-uniform fiber orientation within the preform. For example, the resin composition throughout the volume of the preform may be varied, e.g., as a function of the location within the volume of the carbon fiber preform, rather than remain substantially uniform. As another example, the type of fiber (e.g., polyacrylonitrile (PAN) fibers versus pitch fiber) throughout the volume of the preform may be varied, e.g., as a function of the location within the volume of the carbon fiber preform, rather than remain substantially uniform throughout the preform. As another example, the orientation of the carbon fibers about the fiber longitudinal axis throughout the volume of the preform may be varied, e.g., depending on the location within the volume of the carbon fiber preform, rather than remain substantially uniform throughout the preform.

The variable composition of the resin throughout the volume of the preform, the variable type of carbon fibers within the volume of the preform, and/or variable orientation of the fibers throughout the volume of the preform may be precisely controlled using a three-dimensional printing process to influence one or more properties of a densified carbon-carbon composite material formed from the preform. For example, the variable composition of the resin throughout the volume of the preform, the variable type of carbon fibers within the volume of the preform, and/or variable orientation of the fibers throughout the volume of the preform may be selected to at least one of modify a friction property, increase a density, or increase a strength of a densified carbon-carbon composite material formed from the carbon fiber preform.

Additionally or alternatively, the variable composition of the resin throughout the volume of the preform, the variable type of carbon fibers within the volume of the preform, and/or variable orientation of the fibers throughout the volume of the preform may be selected to modify the propensity of all or portion of the carbon-carbon material to oxidize, especially with respect to catalytic oxidation. For example, reducing the propensity of the carbon-carbon composite material at a non-friction surface to oxidize may be achieved by increasing the density and/or decreasing porosity near non-friction surfaces of the brake disc. In some examples, using one or more of the techniques described herein, a densified C—C composite brake disc may exhibit a relatively low density (e.g., approximately 1.7 gram per cubic centimeter (g/cc) or less) at or near the center of the disc but exhibits a substantially higher density (e.g., approximately 1.9 g/cc or greater) and/or lower porosity nearer one or more surfaces (e.g., non-frictions surfaces) of the densified composite disc.

As another example, the variable composition of the resin throughout the volume of the preform, the variable type of carbon fibers within the volume of the preform, and/or variable orientation of the fibers throughout the volume of the preform may be selected to increase thermal conductivity near a friction surface of the C—C composite disc (or other structure) in a direction substantially perpendicular to the friction surface to allow for better heat flow away from the friction surface.

In each instance, by controlling the composition of the resin, the type of carbon fibers, and/or variable orientation of the fibers throughout the volume of the preform via a three-dimensional printing process, the properties of a densified carbon-carbon composite material formed from such a carbon fiber preform may be tailored, e.g., based on the particular application for the densified carbon fiber preform. In some cases, the density of a C—C composite disc at non-friction surfaces may be of less importance than having a relatively low porosity (e.g., a substantially closed porosity) to prevent oxidation. The density at a friction surface is important but the density of the C—C composite disc at the friction surface may be reduced in order to achieve a desirable level of heat transfer from the friction surface toward the center of the disc, which may exhibit a relatively high density and heat capacity. In some examples, examples techniques may be employed to obtain: high density and/or high density at or near the center of a C—C composite disc for desirable heat absorption; a desired coefficient of friction at the friction surfaces of the C—C composite disc along with high friction stability and low wear at the friction surfaces; and non-friction surfaces exhibiting relatively high oxidation resistance, including resistance to catalytic oxidation.

Examples of the disclosure may allow for one or more advantages. For example, in some instances, utilizing a three-dimensional printing process to control the resin composition, type of carbon fiber, and/or orientation of fibers within a preform may allow for the preform to be designed and manufactured with preferential differentiation of properties, e.g., at different portions of the C—C composite structure. For example, for a carbon-carbon composite brake disc formed from the preform, differential fiber orientation about the fiber longitudinal axis near friction surfaces versus at or near the center of the disc versus non-friction surfaces may allow for optimization of heat transfer away from the friction surface and heat absorption within the bulk of the disc volume. This may be achieved by depositing fibers with relatively high heat transfer coefficient such that the longitudinal axis of the fiber are oriented in the direction perpendicular to the friction surface near the friction surface. The strength of the resulting carbon-carbon composite disc in the lug area may be improved by laying out the fibers in accordance with the results of stress analysis software. Fibers near the surface of non-friction surface areas may be arranged in a way that promotes densification process resulting in high density and low porosity, two parameters that limit carbon oxidation, especially catalytic oxidation.

FIG. 1 is a conceptual diagram illustrating an example assembly 10 that may include one or more C—C composite material components formed in accordance with the techniques of this disclosure. For ease of description, examples of the disclosure will be described primarily with regard to aircraft brake discs formed of C—C composite materials. However, the C—C composite materials and carbon fiber preforms of this disclosure may be used to form components other than aircraft brake discs. For example, the C—C composite material may be used a friction material in other types of braking applications, as well as in other applications in the aerospace industry or in other industries, such as, e.g., heat exchangers and heat shields.

In the example of FIG. 1, aircraft brake assembly 10 includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor discs 36 and stator discs 38; rotor discs 36 are configured to move relative to stator discs 38. Rotor discs 36 are mounted to wheel 12, and in particular wheel hub 20, by beam keys 40. Stator discs 38 are mounted to axle 18, and in particular torque tube 42, by splines 44. Wheel assembly 10 may support any variety of private, commercial, or military aircraft.

Wheel assembly 10 includes wheel 18, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 is configured to provide a braking function to an aircraft via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 by splines 44. In the example of FIG. 1, brake stack 16 includes four rotors and five stators. However, a different number of rotors and/or stators may be included in brake stack 16 in other examples. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking (e.g., rejected takeoff) may result in temperatures in excess of 500 degrees Celsius, and in some cases, even beyond 800 degrees Celsius. As such, rotor discs 36 and stator discs 38 that form brake stack 16 may include robust, thermally stable materials capable of operating at such temperatures.

Figure 6:
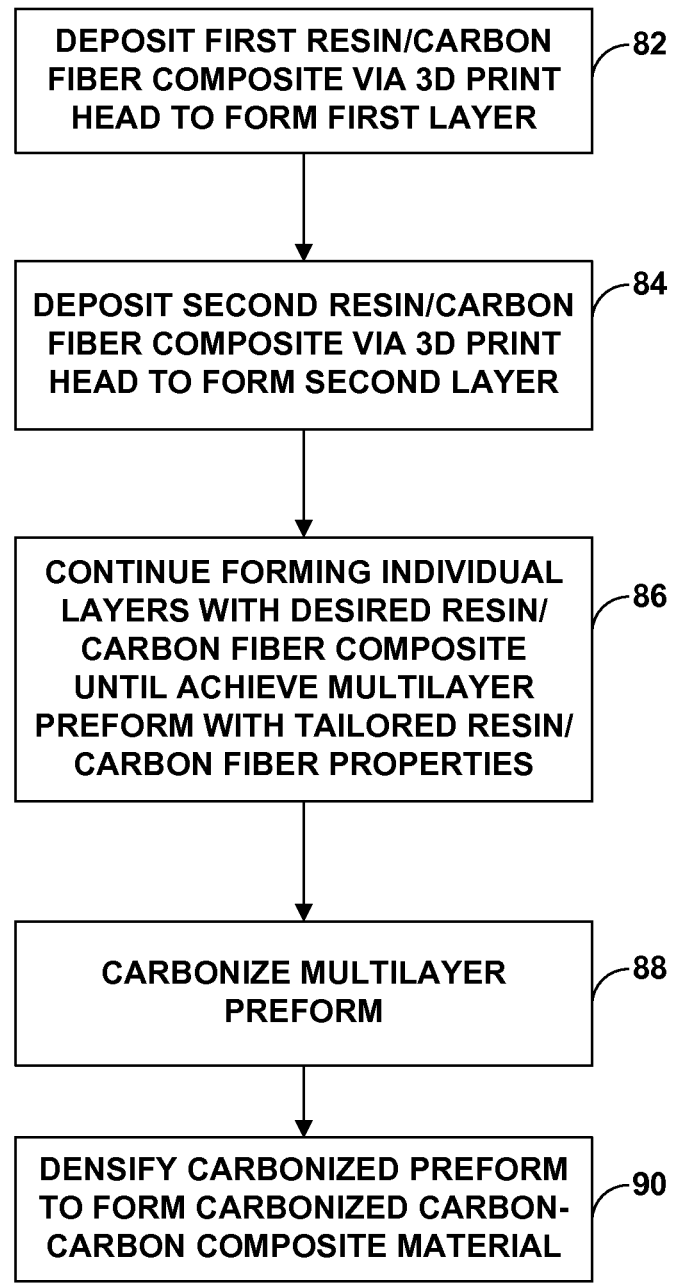
FIG. 6 is a flow diagram illustrating an example method of forming an example carbon fiber preform and a densified carbon-carbon composite material from the carbon fiber preform.

In one example, rotor discs 36 and/or stator discs 38 are formed of a C—C composite material fabricated according to one or more example techniques of this disclosure (e.g., the technique described with respect to FIG. 6). In particular, at least one of rotor discs 36 and/or at least one of stator discs 38 may be formed from densified C—C material fabricated from a carbon fiber preform generated via one or more of the example techniques of this disclosure. Rotor discs 36 and stator discs 38 may be formed of the same materials or different materials. For example, wheel assembly 10 may include metal rotor discs 36 and C—C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As briefly noted, in some examples, rotor discs 36 and stator discs 38 may be mounted in wheel assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. Splines 44 may, for example, be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10.

The example assembly 10 shown in FIG. 1 is merely one example. In other examples, assembly 10 and the components of assembly 10 (e.g., wheel 10, actuator assembly 14, brake stack 16, and axle 18) may have another suitable configuration. In addition, in other examples, the C—C composite materials described herein resulting from example carbon fiber preforms may be used to form other structures in addition to, or instead of, one or more of discs 36, 38, keys 40, and spline 44.

Figure 2:
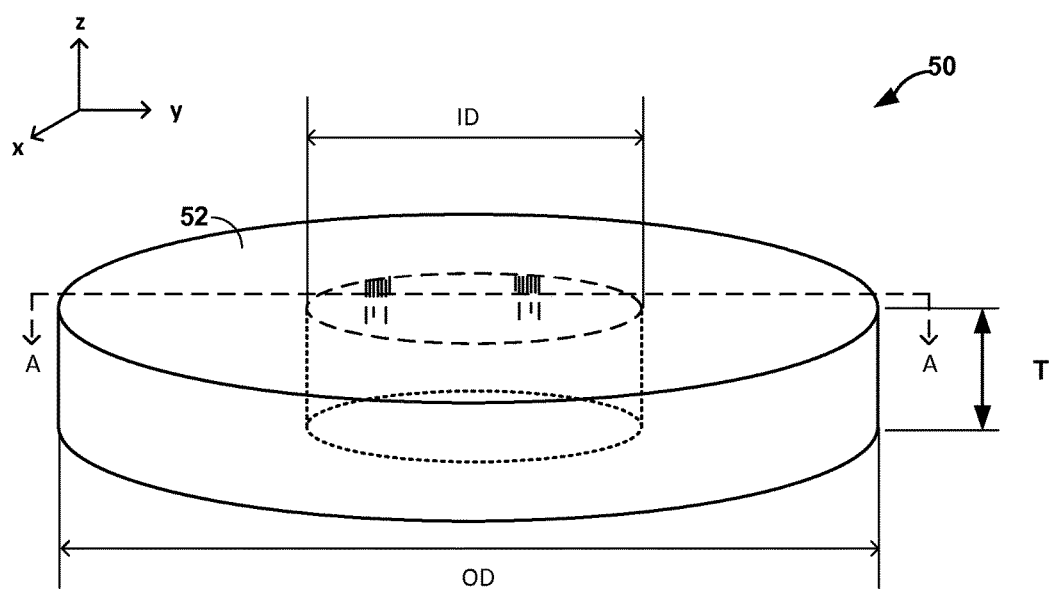

FIG. 2 is a conceptual diagram illustrating example carbon fiber preform 50 in accordance with aspects of the disclosure. As shown, preform 50 is an annular ring with an inner diameter (ID), outer diameter (OD), and a thickness (T) in the z-axis direction (orthogonal x-y-z axes are shown in FIG. 2 for ease of description). Carbon fiber preform 50 is defined by substrate 52, and includes a plurality of individual layers extending in approximately the x-y plane (not shown in FIG. 2) and including carbon fibers and resin. The carbon fibers and resin may be deposited via a print head of a three-dimensional printing device. In some examples, preform may have an inner diameter (ID) of about 4 inches (about 10.16 cm) to about 18 inches (about 45.72 cm), and outer diameter (OD) of about 10 inches (about 25.4 cm) to 30 inches (about 76.2 cm), and a thickness (T) of about 0.5 inches (about 1.27 cm) to about 2.5 inches (about 6.35 cm). Other ranges and geometries are contemplated.

FIG. 3 is a schematic diagram illustrating preform 50 taking along cross-section A-A indicated in FIG. 2. As shown, preform 50 includes a plurality of individual layer $54X_1$, $54X_2$, $54X_3$, $54X_4$, ... and $54X_N$, where N is the total number of individual layers in the z-axis direction. The layers will be collectively referred to as layers 54. In total, these individual layers define the thickness, T, of preform 50 in the z-axis direction. Each individual layer 54 is formed of plurality of carbon fibers 53 and resin 55. The thickness of the individual layers 54 may be dependent on the design intent of the composite material for a given application. In some examples, the thickness of the individual layers may be between approximately 25 mils (approximately 0.635 millimeters (mm)) and approximately 125 mils (approximately 3.175 mm), although other thicknesses are contemplated. In some examples, the overall thickness, T, of preform 50 may be between approximately 0.5 inches (approximately 1.27 centimeters (cm)) to approximately 2.5 inches (approximately 6.35 cm), although other thicknesses are contemplated.

FIG. 4 is a schematic diagram illustrating a cross-section of layer $54X_4$ of preform 50 in the x-direction, which is representative of the configuration of each of the respective individual layers 54 of preform 50. As shown, layer $54X_4$ includes a plurality of individual rows $56X_1$, $56X_2$, $56X_3$, $56X_4$, ... and $56X_y$, aligned side-by-side in the x-axis direction, where y is the total number of individual rows in the x-axis direction. Again, each individual row 56 includes plurality of carbon fibers 53 and resin 55 deposited by a print head of a three-dimensional printing system. Rows 56 combine to form layer $54X_4$ in the x-y plane that also includes thickness in the z-axis direction.

Rows 56 may be deposited in any suitable configuration to form layer $54X_4$ in the x-y plane. For example, rows 56 may be linear rows formed in a grid pattern, concentric circles, e.g., from the ID to the OD of preform 50, or in a coiled pattern, e.g., from the ID to the OD of preform 50, which may allow for the continuous deposition of resin 55 and carbon fibers 53 compared to a pattern of concentric circles. The individual rows 56 may each have any suitable width and cross-sectional shape, both of which may depend on the design of the three-dimensional (3D) print head and may be selected based on the design intent of the composite material formed from the preform. In some examples, the individual rows 56 may have a substantially circular, oval, rectangular, triangular or other suitably shaped cross-section (the cross-section being taken along the x-z plane) and may have a width of approximately 5/16 of an inch (approximately 7.9375 millimeters (mm)) to approximately 1/8 of an inch (approximately 3.175 mm). Rows 56 of each layer 54 may be uniform in at least one dimension in some examples, while in other examples, at least two rows 56 may have a different configuration from each other (e.g., a different width, measured in the x-axis direction).

Preform 50 may include plurality of carbon fibers 53. Any suitable carbon type of carbon fiber may be used, such as, e.g., PAN fibers, pitch fibers, oxidized PAN, carbon fiber derived from PAN, carbon fiber derived from pitch, rayon, and the like. The carbon fibers may provide structural strength in the finished composite material. The carbon fibers may each be a single filament or a carbon fiber tows. In some examples, a length of the fiber or fiber tows can vary from about 0.1 inch (about 2.54 millimeters) to being substantially continuous (e.g., continuous). In addition, in some examples, each carbon filament may be less than or equal to, e.g., about 20 microns in diameter. In some examples, the length of the fibers within preform 50 may be varied along the thickness, T, of the preform. For example, the fibers near an outer surface of preform 50 may each have a length of approximately 0.25 inches (approximately 6.35 mm) while the fibers near the geometric middle of preform 50 may have a length of approximately 3 inches (approximately 7.62 cm) or less.

Preform 50 also includes resin 55. Any suitable resin used for forming preform 50 may be used. For example, the resin may be a carbonizable resin or pitch (e.g., isotropic pitch and/or mesophase pitch) such that carbon is formed from the resin during a carbonization process. Example types of resins include, but are not limited to, synthetic, coal tar, petroleum isotropic and mesophase pitch, phenolic resin, epoxy resin or other carbon yielding resins.

In some examples, the resin may include pitch. The pitch may be a hydrocarbon-rich material that may be extracted, e.g., from coal tar, and petroleum. In some examples, the pitch may also be synthetically produced. In different examples, the pitch may come from a single source (e.g., coal) or may be a combination of different pitches from different sources. In some examples, the pitch may be a mesophase pitch. In other examples, the pitch may be an isotropic pitch. Combinations of mesophase and isotropic pitches are also contemplated.

In some examples, resin 55 may include one or more additive materials. Example additives may include silicon carbide powder, carbon black, graphite powder, titanium oxide, silica powder (to be converted later to silicon carbide through appropriate heat treatment) and similar materials.

As described herein, resin 55 and carbon fibers 53 of layers 54 may be deposited via a three-dimensional printing process such that carbon fiber preform 50 that exhibits at least one of a non-uniform composition of the resin within its volume, different types of the carbon fibers within its volume, or non-uniform fiber orientation within its volume. For example, the resin composition, type of carbon fiber, and/or fiber orientation may differ on a layer-by-layer basis with regard to individual layers 54 within preform 50. Additionally or alternatively, the resin composition, type of carbon fiber, and/or fiber orientation may differ within a single individual layer 54 of preform 50.

The particular resin composition, fiber type and/or fiber orientation at a particular location within the volume of preform 50 may be selected based on the particular location. For example, the resin composition, fiber type, and/or fiber orientation nearer the center of preform 50 in the z-axis direction may be different than the resin composition, fiber type, and/or fiber orientation nearer the top or bottom surface of preform 50 in the z-axis direction. In some examples, the resin composition, fiber type, and/or fiber orientation nearer the center of preform 50 in the z-axis direction may be selected to provide for a relatively high density and heat capacity in a densified C—C composite formed from preform 50 while the resin composition, fiber type, and/or fiber orientation near the friction surface of preform 50 may provide for a lower density material that provides for a desirable balance between friction and wear performance in the densified C—C composite formed from preform 50. As another example, the resin composition, fiber type, and/or fiber orientation in the portions of preform 50 near the outer perimeter (or OD) surface region and inner perimeter (or ID) regions, e.g., the lug regions, may be selected to increase the strength of those portions in the densified C—C composite materials compared to other portions of the densified C—C composite.

In some examples, resin 55 may vary in terms of composition from one portion of preform 50 to another portion of preform 50 such that the resin is non-uniform within preform 50 rather than being substantially uniform throughout preform 50. For example, resin 55 in individual layer $54X_1$, may have a composition that is different than the composition of resin 55 in individual layer $54X_4$. Alternatively or additionally, resin 55 within one portion of individual layer $54X_1$ may have a different composition compared to that within another portion of individual layer $54X_1$. Resin composition may differ in terms of the particular type of resin used (e.g., pitch versus phenolic resin). For example, resin 55 in individual layer $54X_1$ may be a pitch while resin 55 in individual layer $54X_4$ may be a phenolic resin.

Resin composition may also differ in terms of concentration of components within composition when resin 55 includes a mixture of multiple resin types and/or a resin and one or more additives. For example, resin 55 in individual layer $54X_1$, may be a mixture of 80 weight percent (wt %) pitch and 20 wt % phenolic resin while resin 55 in individual layer $54X_4$ may be a mixture of 5 wt % pitch and 95 wt % phenolic resin. As another example, resin 55 in individual layer $54X_1$, may be a mixture of 80 wt % pitch and 20 wt % additive while resin 55 in individual layer $54X_4$ may be a mixture of 95 wt % pitch and 5 wt % additive.

The non-uniform composition of resin 55 within preform 50 may be tailored such that a C—C composite material formed from preform 50 may exhibit one or more desirable properties. For example, the non-uniform composition of resin 55 within preform 50 may result in the modification of one or more properties of a C—C composite material formed by carbonizing and densifying preform 50 (e.g., via CVI/CVD), as compared to the properties that would be exhibited by preform 50 with a substantially uniform composition.

As one example, the non-uniform composition of resin 55 within preform 50 may be selected and controlled to increase the density at one more locations within a densified C—C composite formed from preform 50 compared to that of other location within the densified C—C composite material. For example, the composition of resin 55 in the layers 54 of preform 50 near or at the geometric center of preform 50 in the z-axis direction may be selected to provide for a relatively high density material (e.g., great than about 1.85 g/cc) at that location compared to the layers nearer the top and bottom surface of preform 50 after preform 50 has been carbonized and densified to form a densified C—C disc. As one example, a resin composition with a relatively high carbon yield, such as, e.g., mesophase pitch, may be deposited in the layers of preform 50 nearer the geometric center to provide for a high density in the corresponding location of the densified C—C composite disc formed from preform 50, e.g., as compared to a resin composition with a relatively low carbon yield deposited at one or more other portions of the C—C composite disc. In some examples, a high carbon yield resin may yield about 80 percent to about 90 percent carbon, and/or a low carbon yield resin may yield less than about 50 percent carbon.

In this manner, a C—C composite disc may be formed with a tailored density throughout the volume. For example, compared to other fabrication techniques for making C—C composite discs from preforms which provide for lower density center portions relative to those portions nearer the outer surfaces, the deposition of high carbon yielding resin composition at the center portions of a preform may allow for a substantially uniform density throughout a C—C composite disc formed from the preform. In some examples, the density of an example C—C composite disc may vary less than approximately 2 percent throughout the volume of the disc. In some examples, the specific heat capacity in the center portion of a C—C composite material formed from preform 50 may be greater than or equal to approximately 0.72 kiloJoule/kilogram Kelvin (kJ/kg K).

The non-uniform composition of resin 55 within preform 50 may also be controlled to modify one or more friction properties of a densified C—C composite material formed from preform 50 in those portions corresponding to individual layers 54 at or near the top and bottom surfaces of preform 50 in the z-axis direction, e.g., as compared to that portions nearer the center. In the case of preform 50, the top and bottom surfaces in the z-axis direction may correspond to the friction surface regions of a densified C—C composite material formed from preform 50. Friction surface regions (also referred to as working surface regions) generally correspond to the surface portions of a brake disc or other frictional component that, unlike non-friction surface regions, frictionally engages with an opposing brake disc or other opposing friction component during a braking operation. In the case of a C—C composite brake disc formed from preform 50, the friction surface regions may correspond to the outer faces of the annular ring, and the non-friction surface regions 54 may correspond to the outer perimeter (or OD) surface region and inner perimeter (or ID) regions, e.g., lug regions.

In some examples, the composition of resin 55 in the layers at or near the portions of preform 50 corresponding to the friction surface regions of a C—C composite formed from preform 50 may be selected to balance friction and wear performance of the C—C composite structure. In the case of a brake disc, in addition to relatively low and uniform wear rates, desirable properties for the friction surface regions of the C—C composite may include preferred coefficient of friction exhibited at the surface, e.g., from about 0.1 to about 0.3, but more importantly stability of friction, i.e., stability of the torque curve (torque plotted as a function of brake rotational velocity). For a C—C composite brake disc, stability may desirably be maintained during each brake engagement from the beginning of brake application to the complete stop of the aircraft or other vehicle, as well as stability of brake applications across the entire spectrum of brake engagements with respect to velocity, energy, temperature, environmental conditions, and the like.

In some examples, the composition of resin 55 in such portions may increase the uniformity of the frictional surfaces, e.g., by increasing the uniformity of the wear rates across the frictional surfaces. In some examples, the particular resin composition may cause the wear rate of the frictional surfaces to be less dependent on temperature. For example, the difference between wear rates of the friction surfaces at low operating temperature versus high operating temperatures of a C—C composite material formed from preform 50 may be less than a C—C composite material formed from a preform using the resin composition used in the portions nearer the center of preform 55 to provide for relatively high density and/or heat capacity.

In one example, the composition of resin 55 in the layers at or near the portions of preform 50 corresponding to the friction surface regions of a C—C composite formed from preform 50 may be a mixture of phenolic resin and pitch. In some examples, a pitch that provides for mesophase structure in the resulting densified C—C composite material may be selected. The pitch may generally provide for high density, less wear, and high friction performance of the resulting densified C—C composite material. The phenolic resin may provide for carbon that is mostly isotropic in the resulting densified C—C composite material and may provide for desirable wear performance but not friction performance, e.g., as compared to pitch.

The particular amounts of each resin in the mixture may be selected to provide a balance between friction and wear performance at the friction surface regions. In some examples, the composition of resin 55 in the layers at or near the portions of preform 50 corresponding to the friction surface regions of a C—C composite formed from preform 50 may include approximately 10 wt % to approximately 100 wt % mesophase pitch, such as, e.g., approximately 70 wt % to approximately 90 wt % mesophase pitch, and approximately 0 wt % to approximately 90 wt % phenolic resin, such as, e.g., approximately 10 wt % to approximately 30 wt % phenolic resin. In some examples, an epoxy resin may be used in place of the phenolic resin or in addition to the phenolic resin in the resin composition.

In some examples, isotropic pitch may be used in place of or as an alternative to mesophase pitch. In general, mesophase pitch may be carbonized to yield graphitizable carbon while phenolic resins yield isotropic carbon. The ratio between those two resin types may be modified to achieve desirable friction and wear performance. Graphitic carbon from mesophase resins will tend to increase wear and increase friction at high energy conditions while isotropic carbon from phenolic resins will tend to lower the friction and lower wear rates In addition to or as an alternative to a non-uniform resin composition within preform 50, the fiber type and/or fiber orientation of carbon fibers 53 may vary from one portion of preform 50 to another portion of preform 50 such that the fiber type and/or fiber orientation is non-uniform within preform 50 rather than being substantially uniform throughout preform 50. For example, the type of fibers 53 in individual layer $54X_1$, may be different than the type of fibers 53 in individual layer $54X_4$. Fiber types may differ in terms of the composition of the fiber (e.g., pitch fiber versus PAN fiber). For example, fibers 53 in individual layer $54X_1$, may be a PAN fiber while fibers 53 in individual layer $54X_4$ may be a pitch fiber.

Different fiber types may also include mixtures of two or more fiber types, where the individual fiber types are present in different amounts. For example, fibers 53 in individual layer $54X_1$, may be a mixture of 80 weight percent (wt %) pitch fiber and 20 wt % PAN fiber while fibers 53 in individual layer $54X_4$ may be a mixture of 5 wt % pitch fiber and 95 wt % PAN fiber. Alternatively or additionally, fibers 53 within one portion of individual layer $54X_1$ may be a different type compared to the other fibers 53 within another portion of individual layer $54X_1$.

As another example, the orientation of fibers 53 in individual layer $54X_1$, may be different than the orientation of fibers 53 in individual layer $54X_4$. The orientation of fibers 53 may be referenced with regard to the x-y-z axis shown in FIGS. 2-4 with regard to preform 50. For example, the longitudinal axis of substantially all of fibers 53 in individual layer $54X_1$, may extend substantially along the x-y plane of preform 50 while the longitudinal axis of fibers 53 in individual layer $54X_4$ may exhibit a greater degree of z-axis direction orientation, e.g., wherein some or substantially all of the fibers in an individual layers may be deposited such that the longitudinal axis of fibers extends out of the x-y plane and into the z-axis direction substantially along (e.g., along or nearly along) the longitudinal axis of the carbon fiber. Alternatively or additionally, fibers 53 within one portion of individual layer $54X_1$ may have a different orientation compared to that of the fiber orientation within another portion of individual layer $54X_1$.

The different types of fibers 53 and/or non-uniform orientation of fibers 53 within preform 50 may be tailored such that a C—C composite material formed from preform 50 may exhibit one or more desirable properties. For example, the different types of fibers 53 and/or non-uniform orientation of fibers 53 within preform 50 may result in the modification of one or more properties of a C—C composite material formed by carbonizing and densifying preform 50 (e.g., via CVI/CVD), as compared to the properties that would be exhibited by preform 50 with a substantially the same types of fibers 53 and/or substantially uniform orientation of fibers 53.

As one example, the different types of fibers 53 and/or non-uniform orientation of fibers 53 within preform 50 may be controlled to increase the density at one more locations within a densified C—C composite formed from preform 50 compared to that of other location within the densified C—C composite material. For example, the type of fibers 53 in the layers 54 of preform 50 near or at the geometric center of preform 50 in the z-axis direction may exhibit a relatively high density, e.g., a pitch fiber, compared to the type of fibers in layers 54 nearer the top and bottom surface of preform 50. An example of high density fiber may be a carbon fiber produced from mesophase pitch, which may exhibit, e.g., a density of approximately 1.9 g/cc to approximately 2.18 g/cc.

Alternatively or additionally, the orientation of fibers 53 in the layers 54 of preform 50 near or at the geometric center in the z-axis direction may provide for a relatively high fiber volume fraction (e.g., approximately 30 percent to approximately 50 percent) compared to the fiber volume fraction of the fibers 53 in layers 54 nearer the top and bottom surface of preform 50. In such cases, after preform 50 has been carbonized and densified to form a densified C—C composite, the densified C—C composite may exhibit a relatively high density at the portions nearer the center compared to the density of the portions nearer the top and bottom surfaces. For example, the densified C—C composite may exhibit a density of approximately 1.9 g/cc or greater at or near the center and a density of approximately 1.85 g/cc or less at the portions nearer the top and bottom surfaces.

As another example, the different types of fibers 53 and/or non-uniform orientation of fibers 53 within preform 50 may be controlled to modify one or more friction properties of a densified C—C composite material formed from preform 50 in those portions corresponding to individual layers 54 at or near the top and bottom surfaces of preform 50 in the z-axis direction, e.g., as compared to that portions nearer the center. As described above, in the case of preform 50, the top and bottom surfaces in the z-axis direction may correspond to the friction surface regions of a densified C—C composite material formed from preform 50, and the non-friction surface regions may correspond to the outer perimeter (or OD) surface region and inner perimeter (or ID) regions, e.g., lug regions, of preform 50.

In some examples, the orientation and/or type of fibers 53 in the layers at or near the portions of preform 50 corresponding to the friction surface regions of a C—C composite formed from preform 50 may be selected to balance friction and wear performance. For example, fibers 53 in such portions may be orientated such that the longitudinal axis of the fibers extends substantially along the x-y plane of preform 50. In the case of a brake disc, for example, fibers 53 having a longitudinal axis in an x-y orientation, especially fibers having longitudinal axes tangential to the direction of relative motion of the brake disc in use, will lower wear rates. In contrast, fibers 53 spanning the portion between the friction surface and center of preform 50 may be orientated to increase the proportion of fibers extending in the z-axis direction of preform 50, e.g., to promote thermal conduction to the center portion of preform 50 from the friction surfaces.

Additionally or alternatively, fibers 53 in the layers at or near the portions of preform 50 corresponding to the friction surface regions of a C—C composite formed from preform 50 may be PAN fibers while in contrast, fibers 53 nearer the center of preform 50 may be mesophase pitch fibers. Mesophase pitch fibers may have a greater thermal conductivity after heat treatment than isotropic PAN fibers, thus providing higher thermal conductivity in the center portion of preform 50 compared to the portions nearer the friction surfaces. PAN fibers may be less orientated than pitch fibers and more isotropic. Furthermore, PAN fibers have higher strength than pitch fibers and, therefore, they are more resistant to wear.

As another example, the different types of fibers 53 and/or non-uniform orientation of fibers 53 within preform 50 may be controlled to increase the strength of selected portions of a densified C—C composite material formed from preform 50. For example, the portions of preform 50 corresponding to the lug regions of a C—C composite brake disc (e.g., at the ID and/or OD of the brake disc) formed from preform 50 may be strengthened via the type and/or orientation of fibers 53 in those regions to help withstand the relatively high forces applied to those portions during operation as a C—C brake disc. In some examples, at the portions of preform 50 corresponding to such lug regions, the longitudinal axis of fibers 53 may be oriented substantially evenly between the x-y plane of preform 50 and the z-direction of the preform 50 in contrast to those fiber 53 in the portions at or near the friction surfaces, which may be oriented substantially entirely in substantially the x-y plane of preform 50, or fibers 50 nearer the center portion of preform 50, which may be orientated such that the longitudinal axis of the fibers extends substantially in the z-direction of preform 50. In this manner, the lug regions of a densified C—C composite brake disc formed from preform 50 may exhibit increased strength compared to the portions at or near the friction surfaces or those portions nearer the center of the composite. In some cases, PAN fibers may be preferred in the lug regions dues to the relatively high strength of the fibers.

Any suitable system and techniques may employed to deposit resin 55 and/or carbon fibers 53 via a print head of a 3D printing system to generate the described examples of preform 50 and densified C—C composite material formed therefrom. Described further below are examples of systems and technique that may be employed. However, other examples and system are contemplated. In some examples, one or more of the 3D printing systems and techniques for forming a carbon fiber preform and densified C—C composite material (e.g., a C—C composite brake disc) described in U.S. patent application Ser. Nos. 14/711,550, 14/711,508, and 14/711,590, each filed May 13, 2015, may be employed to form one or more example preforms and C—C composite materials described herein. The entire content of each of these applications is incorporated by reference herein.

In some examples, resin 55 and carbon fiber 53 may be deposited in a melted state (a melted composite material) via a print head (e.g., either onto an existing layer of carbon fibers and/or with the carbon fibers mixed with the resin and additive powder), which may then be solidified to form a respective layer 54 (or portion of a layer in the form of a row, for example), followed by the deposition of additional resin 55 and carbon fibers 53 on the respective layer to form an additional layer including carbon fibers and composite mixture. In other examples, individual layers 54 of carbon fiber preform 50 may be formed by depositing, via a print head of a three-dimensional printing system, a plurality of individual carbon fibers 53 each coated with resin 55. In some examples, the three-dimensional printing system may employ a pultrusion process to coat a substantially continuous (e.g., continuous or nearly continuous) carbon fiber filament with the resin 55, and then cut the coated filament into individual carbon fibers 53 coated with the resin 55. In each case, the three-dimensional printing deposition process may be controlled such that preform 50 exhibits at least one of non-uniform resin composition, different types of fibers, or non-uniform fiber orientation within the volume of preform 50, as described herein.

The carbon fiber preform generated via either process may then be carbonized and densified to generate a densified carbon-carbon composite material, such as, e.g., a carbon brake disc. In some examples, individual layers 54 of carbon fibers 53 and resin 55 may be formed and densified on a layer by layer basis during the 3D printing process, e.g., rather than forming all layers of carbon fibers 53 and resin 55 followed by the densification of those layer in total.

Figure 5:
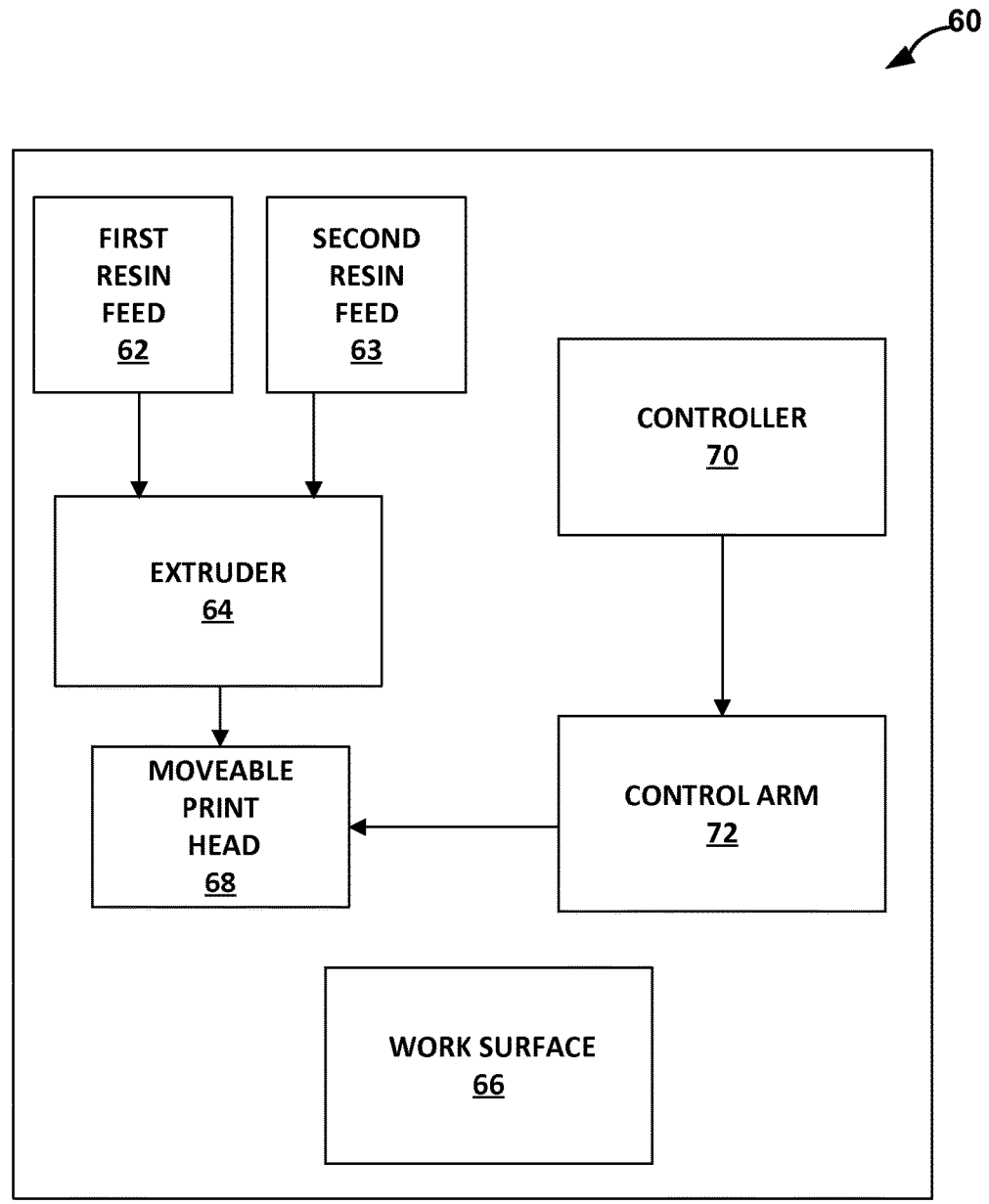
FIG. 5 is a schematic diagram illustrating an example three-dimensional printing system which may be used to manufacture the example preform of FIGS. 2-4.

FIG. 5 is a schematic diagram illustrating example three-dimensional printing system 60 which may be used, e.g., to form preform 50 via an additive manufacturing process. Any suitable system configured to deposit resin 55 and/or fibers 53 to form preform 50 using 3D printing or other additive manufacturing techniques may be used. For ease of description, system 60 is described in terms of an extrusion deposition system. However, other systems for forming preform 50 are contemplated.

As shown, system 60 includes first resin feed 62 which is configured to feed a first resin to extruder 64, and second resin feed 63 which is configured feed a second resin with a different composition than the first resin to extruder 64. The first and second resin compositions may be in the form of prefabricated pellets or a coiled ring of prefabricated resin compositions. Extruder 64 may be configured to heat each resin composition to a temperature that melts the resin (e.g., to a liquid state or otherwise softens composite mixture 55) in a manner that allows the heated material to flow out of one or more outlets define by moveable printer head 68. In some examples, only first resin feed 62 supplies extruder 64 with resin 55 for deposition, only second resin feed 62 supplies extruder 64 with resin 55 for deposition, or both first resin feed 62 and second resin feed 63 both supply resin to extruder 64 at the same time or otherwise for a given layer 54 (FIG. 2) to allow for the deposition of a mixture of the first and second resins. In this manner, preform 50 formed using system 60 may exhibit a non-uniform resin composition throughout preform 50.

The material flowing out of printer head 68 may be deposited on work surface 66, e.g., either directly or indirectly onto one or more layers of resin 55 and fibers 53 previously deposited. The deposited material may be allowed to cool to form a solid layer of resin and/or fibers, and the process may be repeated by adjusting the position of print head 68 in three-dimensions above work surface 66, which supports the deposited layers throughout the three-dimensional printing process. Resin 55 may be deposited via print head 66 on a continuous or discontinuous basis during the printing process. In some examples, the melting and extrusion steps may be carried out in a cross head extrusion system.

Although examples of printing system 60 of FIG. 5 is primarily described with regard to the deposition of resin 55, in some examples, resin 55 from first resin feed 62 and/or second resin feed 63 may also include carbon fibers 53 mixed with resin 55 such that the deposition of resin 55 via print head 68 may include the deposition of carbon fibers 53 along with resin 55. The type of carbon fiber in first resin feed 62 may be different than the type of carbon fiber in second resin feed 63, e.g., to provide for different types of carbon fibers 53 throughout preform 50. Alternatively or additionally, carbon fibers 53 may be deposited separately from resin 55, e.g., as prefabricated carbon fiber fabric segments or fibers 53 formed by depositing the fiber material via print head 68 such that the fibers have a desired orientation and/or or of a desired type of fiber.

In the example illustrated in FIG. 5, system 60 includes controller 70, which may control operation of system 60 during the 3D printing process to provide preform 50 with a desired geometry and composition. For example, during deposition, controller 70 may control the movement of control arm 72, which is attached to moveable print head 68, to control the position of moveable print surface 68 relative to work surface 66. In this manner, controller 70 may control the relative position of moveable print head 68 relative to resin 55 that has already exited out of print head 68 to form individual layers 54 of preform 50, e.g., by depositing individual rows 56 of resin 55 and fibers 53, such that preform 50 exhibits a desirable three-dimensional geometry. Stepper motors or servo motors may be employed to move print head 68 and adjust the flow of resin 55 out of print head 68. Controller 70 may be configured to control the position of controller arm 72 in order to move print head 66 in the x-axis and y-axis directions, and, in some examples, in the z-axis direction. Additionally, controller 70 may control one or more other factors of the additive deposition process, such as, e.g., temperature of resin 55 at one more location within system 60, the timing of the feed of composite resin 55 from feed 62 to extruder 64, the position of print head 68 and/or flow rate of resin 55 out of print head 68.

In some examples, controller 70 may include a microprocessor or multiple microprocessors capable of executing and/or outputting command signals in response to received and/or stored data. Controller 70 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Controller 70 may include computer-readable storage, such as read-only memories (ROM), random-access memories (RAM), and/or flash memories, or any other components for running an application and processing data for controlling operations associated with system 60. Thus, in some examples, controller 70 may include instructions and/or data stored as hardware, software, and/or firmware within the one or more memories, storage devices, and/or microprocessors. In some examples, controller may control print head 66 using a computer-aided manufacturing (CAM) software package running on a microcontroller. Controller 60 may include multiple controllers or only a single controller.

FIG. 6 is a flow diagram illustrating an example technique of forming preform 50 and, subsequently, a densified C—C composite material from preform 50 in accordance with aspects of the disclosure. For ease of illustration, the example of FIG. 6 is described as being performed via system 60 of FIG. 5. However, in other examples, the technique shown in FIG. 6 can be performed by other systems suitable for carrying out the 3D printing of carbon preform 50.

As shown, under the control of controller 70, print head 68 deposits a first resin/carbon fiber composite mixture from first resin feed 62, e.g., on a layer of carbon fibers formed in the x-y plane, to form a first layer of resin 55 and fibers 53, e.g., layer $54X_1$, on work surface 66 (82). Such a process may include forming individual rows (e.g., corresponding to rows 56 shown in FIG. 4 for layer $54X_4$), to form layer $54X_1$ of resin 55 and fibers 53 in the x-y plane. Controller 70 may control the position of print head 68 throughout the process to provide for a desired layer geometry.

After the first layer of resin 55 and carbon fibers 53 has cooled to solidify the layer, under the control of controller 70, print head 68 deposits a second resin/carbon fiber composite mixture from second resin feed 62 to form a second layer of composite material 52 (layer $54X_2$) on first layer $54X_1$ (84). In this manner, the composition of resin 55 in the combination of the first and second layers may be considered non-uniform in cases in which the resin composition of first resin feed 62 is different than the resin composition of second resin feed 63. Similarly, types of fibers 53 in the combination of the first and second layers may be considered to be different in cases in which the type of fibers in first resin feed 62 are different than the type of fibers in second resin feed 63.

The process be repeated to form layers $54X_1$, $54X_2$, $54X_3$, $54X_4$, . . . , and $54X_n$ of preform 50, where each layer is formed from first resin feed 62, second resin feed 63, or a combination of first resin feed 62 and second resin feed 63 (86). Again, controller 70 may control the position of print head 68 in three-dimensions, among others, throughout the deposition process such that the combination of layers $54X_1$, $54X_2$, $54X_3$, $54X_4$, . . . , and $54X_N$ of the resin/carbon fiber mixture form preform 50 with a desired three-dimensional geometry. Moreover, controller 70 may control the type of resin composition and/or type of fiber being deposited throughout the process to provide for preform with non-uniform resin composition and/or different types of fibers throughout, e.g., to provide for one or more of the properties described herein. Controller 70 may control the fiber orientation by controlling the orientation of print head 68 via controller 70 while depositing the fibers.

Subsequently, multilayer carbon fiber preform 50 may be carbonized (88), e.g., by heating temperature of preform 50 to approximately 550 degrees Celsius to approximately 2450 degrees Celsius. During the carbonization process, pyrolysis of the resin and fiber components occurs, and higher molecular weight components are broken down to various gases and carbon. Carbon remains in the carbonized component while the gases are substantially eliminated (e.g., eliminated or nearly eliminated).

Following carbonization of multilayer preform 50 (88), the carbonized preform may be densified with carbonaceous material using chemical vapor deposition (CVD)/chemical vapor infiltration (CVI) (90). For example, the carbonized preform may undergo one or more cycles of CVD/CVI to fill voids in preform 50 resulting from gas evolution during the carbonization processes. The carbonized preform may undergo one or more cycles of CVD/CVI until the material exhibits a desired density. For example, such a material may exhibit a density greater than 1.70 grams per cubic centimeter (g/cc), e.g., between approximately 1.75 g/cc and approximately 1.90 g/cc.

In some examples of CVD/CVI, the carbonized preform is heated in a retort under the cover of inert gas, such as at a pressure below 100 torr. When the carbonized preform reaches a temperature between about 900 degrees Celsius and about 1200 degrees Celsius, the inert gas is replaced with a carbon-bearing gas such as natural gas, methane, ethane, propane, butane, propylene, or acetylene, or a combination of at least two of these gases. When the carbon-bearing gas flows around and through the carbonized preform, a complex set of dehydrogenation, condensation, and polymerization reactions occur, thereby depositing the carbon atoms within the interior and onto the surface of the carbonized preform. Over time, as more and more of the carbon atoms are deposited onto the surfaces of pores in the carbonized preform, the carbonized preform becomes denser. This process may be referred to as densification, because open spaces in the carbonized preform are eventually filled with a carbon matrix until generally solid carbon parts are formed. U.S. Pat. No. 7,332,195 (Arico et al.), the entire disclosure of which is incorporated herein by reference, provides an overview of example CVD/CVI processing that can be used with the techniques described herein. In other examples, other techniques may be used to densify preform 50.

Examples of different techniques for forming carbon fiber preforms have been described. In different examples, techniques of the disclosure may be implemented in different hardware, software, firmware or any combination thereof. In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising depositing a resin and a plurality of carbon fibers via a print head of a three-dimensional printing system to form a carbon fiber preform including a plurality of individual carbon fiber layers, wherein each individual layer of the plurality of individual carbon fiber layers includes the resin and carbon fibers, and wherein the carbon fiber preform exhibits at least one of:

a non-uniform composition of the resin within the preform, or different types of the carbon fibers within the preform.

2. The method of claim 1, wherein the at least one of the non-uniform composition of the resin within the preform or the different types of the carbon fibers within the preform is configured to at least one of modify a friction property, increase a density, or increase a strength of a densified carbon-carbon composite material formed from the carbon fiber preform.

3. The method of claim 1, wherein the plurality of individual carbon fiber layers includes a first carbon fiber layer and a second carbon fiber layer, wherein the resin in the first carbon fiber layer comprises a first resin composition and the resin in the second carbon fiber layer comprises a second resin composition that is different than the first resin composition such that the preform exhibits the non-uniform composition of the resin within the preform.

4. The method of claim 3, wherein the first carbon fiber layer is nearer a center of the preform compared to the second carbon fiber layer, wherein the first resin composition provides for a higher carbon yield compared to the second resin composition.

5. The method of claim 3, wherein the first carbon fiber layer is nearer a friction surface of the preform compared to the second carbon fiber layer, wherein the first resin composition includes a pitch mixed with at least one of phenolic resin or epoxy resin.

6. The method of claim 5, wherein the first resin composition includes approximately 10 weight percent to approximately 100 weight percent of the pitch and up to approximately 90 weight percent of the at least one of the phenolic resin or the epoxy resin.

7. The method of claim 1, wherein the plurality of individual carbon fiber layers includes a first carbon fiber layer and a second carbon fiber layer, wherein the plurality of carbon fibers in the first carbon fiber layer exhibit a first fiber orientation and the plurality of carbon fibers in the second carbon fiber layer exhibit a second fiber orientation that is different than the first fiber orientation such that the preform exhibits a non-uniform fiber orientation within the preform.

8. The method of claim 7, wherein the first carbon fiber layer is nearer a friction surface of the preform compared to the second carbon fiber layer, wherein the plurality of carbon fibers in the first carbon fiber layer extend in substantially an x-y plane of the preform in the first fiber orientation, and wherein the plurality of carbon fibers in the second carbon fiber layer extend out of the x-y plane of the preform into a z-axis direction in the second fiber orientation.

9. The method of claim 7, wherein the first carbon fiber layer is nearer a center of the preform compared to the second carbon fiber layer, wherein the plurality of carbon fibers in the first carbon fiber layer define a first fiber volume fraction in the first fiber orientation, and wherein the plurality of carbon fibers in the second carbon fiber layer define a second fiber volume fraction in the second fiber orientation that is less than the first fiber volume fraction.

10. The method of claim 1, wherein the plurality of individual carbon fiber layers includes a first carbon fiber layer and a second carbon fiber layer, wherein the plurality of carbon fibers in the first carbon fiber layer comprise a first type of carbon fiber and the plurality of carbon fibers in the second carbon fiber layer comprise a second type of carbon fiber that is different than the first type of carbon fiber such that a composition of fibers in the first carbon fiber layer is different that a composition of fibers in the second carbon fiber layer.

11. The method of claim 10, wherein the first carbon fiber layer is nearer a friction surface of the preform compared to the second carbon fiber layer, wherein the first type of carbon fiber is polyacrylonitrile (PAN) fiber and the second type of carbon fiber is pitch fiber.

12. The method of claim 11, wherein the first carbon fiber layer is nearer a center of the preform compared to the second carbon fiber layer, wherein the first type of carbon fiber exhibits a greater density than the second type of carbon fiber.

13. The method of claim 1, further comprising:
carbonizing the carbon fiber preform to form a carbonized carbon fiber preform; and
densifying the carbonized carbon fiber preform to form a densified carbon-carbon composite material.

14. The method of claim 1, wherein the resin comprises at least one of coal tar pitch, petroleum isotropic pitch, or petroleum mesophase pitch.

15. The method of claim 1, wherein depositing the resin and the plurality of carbon fibers via the print head of the three-dimensional printing system comprises:
heating the resin to form a molten resin;
mixing the plurality of carbon fibers into the molten resin to form a composite mixture; and
depositing the composite mixture via the print head of the three-dimensional printing system.

16. The method of claim 1, wherein the preform exhibits both the non-uniform composition of the resin within the preform and the different types of the carbon fibers within the preform.

17. The method of claim 1, wherein depositing the resin and the plurality of carbon fibers via the print head of the three-dimensional printing system comprises changing a composition of carbon fibers being deposited such that at least two portions of the preform comprise different compositions of carbon fibers.

* * * * *